United States Patent [19]

Overholser et al.

[11] B 3,993,738

[45] Nov. 23, 1976

[54] HIGH STRENGTH GRAPHITE AND METHOD FOR PREPARING SAME

[75] Inventors: Lyle G. Overholser, Oak Ridge; David R. Masters, Knoxville; John M. Napier, Oak Ridge, all of Tenn.

[73] Assignee: The United States of America as represented by the United States Energy Research and Development Administration, Washington, D.C.

[22] Filed: Nov. 8, 1973

[21] Appl. No.: 414,028

[44] Published under the second Trial Voluntary Protest Program on February 17, 1976 as document No. B 414,028.

[52] U.S. Cl. .............................. 423/448; 264/29.3; 423/445
[51] Int. Cl.² ........................................ C01B 31/04
[58] Field of Search ........... 423/448, 449, 445, 447; 264/29

[56] References Cited
UNITED STATES PATENTS

| 3,174,895 | 3/1965 | Gibson et al. ........................ 264/29 |
| 3,407,038 | 10/1965 | Beasley ................................ 423/448 |
| 3,552,533 | 1/1971 | Nitz et al. ............................ 423/448 |
| 3,718,720 | 2/1973 | Lambdin et al. ..................... 423/448 |
| 3,720,575 | 3/1973 | Cowlard ............................... 264/29 |
| 3,728,423 | 4/1973 | Shaffer ................................. 264/29 |
| 3,790,393 | 2/1974 | Cowland et al. ..................... 264/29 |

FOREIGN PATENTS OR APPLICATIONS

| 1,569,267 | 10/1970 | Germany .......................... 423/448 |

*Primary Examiner*—Oscar R. Vertiz
*Assistant Examiner*—Eugene T. Wheelock
*Attorney, Agent, or Firm*—Deane E. Carlson; David S. Zachry; Earl E. Larcher

[57] ABSTRACT

High strength graphite is manufactured from a mixture of a particulate filler prepared by treating a particulate carbon precursor at a temperature in the range of about 400° to 1000° C., an organic carbonizable binder, and green carbonizable fibers in a concentration of not more than 2 weight per cent of the filler. The use of the relatively small quantity of green fibers provides a substantial increase in the flexural strength of the graphite with only a relatively negligible increase in the modulus of elasticity.

7 Claims, No Drawings

HIGH STRENGTH GRAPHITE AND METHOD FOR PREPARING SAME

The present invention relates generally to graphite of improved flexural strength, and more particularly to such graphite wherein green carbonizable organic fibers are incorporated in the graphite precursor for providing the improved strength without significantly increasing the modulus of elasticity.

Graphite possesses many properties which are desirable for use in aerospace and nuclear reactor applications. The large temperature gradients across graphite components such as fuel elements and re-entry vehicles create large thermal stresses thereby making it essential that the graphite satisfactory for such applications possess high flexural strength and a high strain-to-failure. The phrase "strain-to-failure" refers to the ability of a graphite component to be elongated or compressed by a load such as thermal stress and still retain its strength and structural integrity. Strain-to-failure is usually defined as the percentage of change in the dimensions of the component that can occur prior to catastrophic failure of the latter.

Efforts to increase the flexural strength and the per cent of strain-to-failure of graphite structures included such practices as employing large quantities of carbon or graphite fibers in the graphite precursor. While these fibers provided a substantial increase in the strength of the formed graphite the modulus of elasticity was also increased so as to substantially negate any gain in strength. Another shortcoming attendant with using carbon or graphite fibers in the precursor is that these fibers are essentially non-plastic which renders them weak and brittle so as to be easily fractured into minute non-fiberlike particles during mixing and forming operations. Such breakage of the fibers detracts significantly from the strength the fibers should provide the graphite article.

High strength, low modulus graphite may be prepared by employing as the particulate filler material in the graphite precursor mixture a thermoplastic carbon precursor which has been coked or calcined at a relatively low temperature so as to retain some degree of plasticity, i.e., capability of additional shrinkage, during graphitization. It was found that by calcining the thermoplastic filler material at a temperature in the range of 400° to 1000°C. the filler material will to some extent shrink with the binder during graphitization so as to minimize the strength-robbing cracking of the graphitized binder which previously occurred when using graphitized filler material in the precursor. However, while the use of the low-fired filler material provided for the preparation of stronger, low-modulus graphite the latter tended to be highly isotropic and possess a relatively high coefficient of thermal expansion, which properties necessitate an even greater gain in strength and strain-to-failure in the graphite in order to qualify as a constructional material in applications subject to high thermal stress such as mentioned above.

Accordingly, it is the principal objective or aim of the present invention to provide a method for substantially increasing the flexural strength and strain-to-failure of graphite prepared from low-fired filler material. This objective is achieved without significantly increasing the modulus of elasticity of the graphite by employing green fibers, i.e., fibers not previously heat treated, in the graphite precursor mixture with the fibers being of an effective amount corresponding to not more than 2 weight per cent of the low-fired filler material.

Other and further objects of the invention will be obvious upon an understanding of the illustrative method and article about to be described, or will be indicated in the appended claims, and various advantages not referred to herein will occur to one skilled in the art upon employment of the invention in practice.

Described generally, the present invention is directed to the formation of graphite which is characterized by its high strength, higher thermal stress resistance, and near isotropy. The method used to prepare this graphite comprises the steps of coking a thermoplastic carbon precursor at a temperature in the range of about 400° to 1000°C. in an inert atmosphere, grinding the resulting coke into particulates less than 100 mesh for providing the filler material, combining green fibers in a quantity up to about 2 weight per cent of the filler material, and stirring the particulates and fibers with a thermoplastic carbon yielding binder material to form a well blended mixture, consolidating and carbonizing the mixture to form a body of a desired configuration by hot pressing the mixture at a temperature in the range of 500° to 1400°C. and a pressure in the range of about 500 to 1600 psi, impregnating the resulting body with liquefied thermoplastic carbon precursor, and/or graphitizing the body at a temperature in the range of about 2500°–3000°C. in an inert atmosphere such as nitrogen, argon or helium. By employing a thermoplastic binder, green fibers and low-fired thermoplastic filler material, they all achieve a "semiplastic" state when heat-treated to form a temperature-stable body. In this semiplastic state, it is believed the binder wets and chemically bonds the filler particles and fibers to form a body having a consolidated mass with the materials in this mass shrinking simultaneously and substantially uniformly, except for the fibers, to reduce the stress and minimize cracking as the body is stabilized with heat. The reduction of stress and cracks in the formed body permits the graphite to remain strong and highly resistant to thermal stress.

The fibers used in the graphite are of the rayon, polyacrylonitrile, and phenolic types which are known to produce good carbon fibers when pyrolyzed. The fibers found to be successful have a length-to-diameter ratio in the range of 100:1 to 1000:1 with the longer fibers in this range providing the larger increase in strength. The quantity of fibers employed ranges from an amount effective to provide an increase in strength over that obtainable without fibers to a maximum amount corresponding to 2 weight per cent of the filler material. With a fiber content greater than 2 weight per cent of the filler material, the modulus of elasticity markedly increases and substantially nullifies the strength increase. Strength increases in the order of 10 to 60 per cent may be obtained with less than 2 weight per cent fibers. The green organic fibers are not damaged during standard mixing and compaction procedures and are believed to be placed in tensison during the carbonization and graphitization steps because of their large shrinkage as compared to the filler material. It is also postulated that the polymeric structure of each fiber is aligned in situ. In theory, the capacity of the organic fibers to shrink by heat treatment is greater than the other components in the precursor mixture. This differential shrinkage applies tension to each fiber so as to, in effect, stretch the fiber and increase the alignment of the polymeric structure in the fiber as the precursor mixture is heated. With the fibers extending for a considerable distance through the graphite structure they act locally to prevent growth in the size of cracks so as to achieve a higher percentage of the inherent strength in a relatively brittle graphite body.

In the present invention the thermoplastic graphite precursors used for the filler, binder, and impregnant are preferably materials derived from indene ($C_9H_8$), specifically isotruxene (ITX, $C_{27}H_{18}$), acenaphthylene (ACN, $C_{12}H_8$), and cinnamylideneindene (CAI, $C_{18}H_{14}$) which is a condensation product of the reaction between indene and cinnamaldehyde. These precursors are preferable since they are relatively easily reproducible and possess a carbon yield of greater than 40 per cent. However, satisfactory results may also be achieved by employing coal tar or petroleum pitches in place of one or more of the indene-derived materials.

When using the indene-derived material as the graphite precursors it has been found that graphite with a lower coefficient of thermal expansion is provided by using the acenaphthylene as the filler, the isotruxene as the binder, and the cinnamylideneindene as the impregnant.

The acenaphthylene filler material may be prepared by air curing the acenaphthylene monomer at a temperature of about 250°C. for a duration of about 40 hours to provide a polymer of acenaphthylene. The air-cured acenaphthylene is coked in an inert atmosphere of argon or helium at a relatively low temperature in the range of 400°–800°C. and then crushed and screened to a particle size less than 100 mesh (Tyler) for forming the low-fired particulate filler which is characterized by its retention of some elasticity as described above.

The isotruxene normally has a melting temperature of about 200°–215°C. and yields of a glassylike graphite but is preferably air-cured at a temperature of about 300°C. for 40–44 hours to decrease the melting temperature to about 100°–120°C. and form semiacicular graphite when graphitized. The air-cured isotruxene is ground and screened to a particle size of less than 70 mesh for use as the binder. The concentration of the binder in the graphite precursor mixture is preferably in the range of about 18 to 25 weight per cent of the mixture.

The cinnamylideneindene preferably contains potassium in a concentration of about 100 to 400 ppm since the crystallinity of the graphite prepared from cinnamylideneindene with such a relatively low concentration of potassium is preferably over the glassylike graphite prepared from cinnamylideneindene with a potassium concentration of about 1400 or more ppm. The potassium content can be selectively reduced to the desired level by repeated washing with methanol. When used as the impregnant the cinnamylideneindene is preferably autoclaved at 300°C. and ~600 psi for 6 hours in a nitrogen atmosphere to form a polymer prior to its use. This treatment of cinnamylideneindene produced a resinous carbon precursor having a melting range of 50°–70°C. To effect impregnation of a hot pressed body of the graphite precursor formed as described above solid cinnamylideneindene resin is preferably melted over the billet while the latter is being evacuated and then the billet submerged in the cinnamylideneindene is autoclaved at a temperature in the range of 140° to 180°C. and pressure of about 1500 to 4500 psi using a hold time of 16 to 20 hours. Following impregnation, the specimen is carbonized (800°C. maximum) and the impregnation cycle repeated (3–5 times) until the desired density is attained; the density increase becomes increasingly slower with repeated impregnations. The billet is finally graphitized at 3000°C. No evidence of cracking of any of the billets is apparent either in the impregnated or unimpregnated state.

Table I below is illustrative of the improvements in the flexural strength and strain-to-failure obtained by practicing the present invention. In this table the samples 1 through 4 were prepared using a dry-blended graphite precursor mixture consisting of a filler of acenaphthylene of a size less than 100 mesh and heat treated at 800°C. as discussed above and 25 pph isotruxene as the binder. The mixtures of samples 1, 3 and 4 were hot-pressed at 1400°C. at a pressure of 1600 psi while Sample 2 was hot-pressed at 1000°C. at the same pressure. Samples 2, 3 and 4 were formulated using green rayon fibers in a quantity corresponding to one weight per cent of the filler. All samples were impregnated with the cinnamylideneindene polymer in the manner described above and then fired at 3000°C.

TABLE I

| Sample No. | Final Bulk Density (gm/cc) | Flexural Strength (psi) | | Modulus of Elasticity (psi × 10⁶) | | Strain at Rupture (per cent) | | CTE (in/in/°C. × 10⁻⁶) Avg. 20–1000°C. | | Thermal Shock Resistance (watts) |
|---|---|---|---|---|---|---|---|---|---|---|
| | | WG[1] | AG[1] | WG | AG | WG | AG | WG | AG | |
| 1 | 1.92 | 3600 | 3000 | 1.2 | 0.69 | 0.42 | 0.69 | 3.3 | 5.5 | 1300–1900 |
| 2 | 1.92 | 6900 | 4800 | 1.9 | 0.81 | 0.68 | 0.86 | 3.9 | 6.6 | >6000 |
| 3 | 1.90 | 4700 | 3000 | 1.3 | 0.65 | 0.60 | 0.80 | 3.2 | 5.9 | 2400–4000 |
| 4 | 1.93 | 6400 | 4500 | 1.4 | 0.63 | 0.62 | 0.53 | 3.5 | 6.8 | >6000 |

[1]WG is with grain and AG is across grain.

As shown in the table, samples 2, 3 and 4 which contain the green fibers in the ground precursor possess a substantially higher flexural strength, thermal shock resistance, and strain-to-failure (strain at rupture) than the fiber-free graphite of Sample 1. Note that the modulus of elasticity remained essentially the same in all samples so as to demonstrate the significance of the present invention of increasing the flexural strength, thermal shock resistance, and strain-to-failure without significantly increasing the modulus of elasticity.

A further illustration of the increased flexural strength and strain-to-failure with negligible increases in the modulus of elasticity is set forth in the following examples and Table II. In these examples the filler was petroleum pitch fired at a temperature of 1000°C. and of an average particle size of 44 microns. The particular petroleum pitch was obtained commercially from POCO Graphite Inc., Decatur, Texas.

EXAMPLE 1

A graphite billet having a nominal 3-inch diameter and 2.5-inch length was molded from a blend of 410 grams of POCO filler particles, 103 grams of isotruxene binder material, and 5 grams of rayon fibers. The rayon fibers had an average diameter of 7 microns and were cut in lengths of about 7000 microns. The billet was molded at a temperature of 1400°C. with a pressure of 1600 psi and graphitized at 2800°C. The physical property data of the molded graphite billet are shown in Table II.

EXAMPLE 2

For a comparison, a graphite billet was molded as described in Example 1 without rayon fibers. The filler material and binder, and the molding conditions for the billet were the same as in Example 1. The physical property data of the billet are listed in Table II.

EXAMPLE 3

A graphite billet containing phenolic fibers was molded and impregnated with cinnamylideneindene before graphitizing. The filler material and binder, and the molding conditions were the same as in Example 1. The physical property data for the billet are listed in Table II.

EXAMPLE 4

To further demonstrate the importance of the small amount of fibers, a graphite billet was prepared without fibers. The other precursors of the molding mixture, except for the binder which was changed to cinnamylideneindene, and molding conditions for the billet were the same as in examples 1 and 3. The physical property data for Example 4 are listed in Table II.

500° to 1400°C. and at a pressure in the range of 500 to 1600 psi, and thereafter graphitizing the resulting carbonized mixture, an improvement in the method consisting of the step of adding to said mixture prior to the carbonizing step a quantity of green fibers of an organic carbonizable material with said quantity being in the range of 2 weight per cent of the particulate filler down to an amount effective to provide an increase in the flexural strength of the graphite over that obtainable without the addition of said quantity of fibers.

2. The method of claim 1 wherein the green fibers are selected from the group consisting of rayon, phenolics, and polyacrylonitriles with a length-to-diameter ratio in the range of 100:1 to 1000:1.

3. The method of claim 2 including the additional step of impregnating the carbonized mixture with a thermoplastic carbonizable organic material at least once prior to graphitizing step.

4. The method of claim 3 wherein the particulate filler, the thermoplastic binder, and the organic material employed as the impregnant are selected from the group consisting of isotruxene, acenaphthylene, cinnamylideneindene, and coal or petroleum pitch.

5. A precursor composition for the manufacture of graphite products in which mixtures of particulate carbonizable filler materials and carbonizable organic binders are formed into the desired article configuration and heated in an inert atmosphere to graphitization temperatures, said graphite precursor composition comprising a particulate filler of a thermoplastic material coked at a temperature in the range of 400° to

TABLE II

| Example No. | Bulk Density (gm/cc) | Flexural Strength (psi) | | Modulus of Elasticity (psi × 10⁶) | | Strain at Rupture (per cent) | | CTE (× 10⁶ in/in°C.) | | Electrical Resistivity (µ ohm-cm) | |
|---|---|---|---|---|---|---|---|---|---|---|---|
| | | WG[1] | AG[1] | WG | AG | WG | AG | WG | AG | WG | AG |
| 1 | 1.80 | 7800 | 8000 | 1.4 | 1.5 | 0.71 | 0.71 | 7.0 | 7.4 | 1400 | 1470 |
| 2 | 1.78 | 6100 | 5900 | 1.2 | 1.2 | 0.57 | 0.55 | 7.0 | 7.6 | 1350 | 1395 |
| 3 | 1.99 | 9200 | 7900 | 1.6 | 1.4 | 0.73 | 0.67 | 6.9 | 7.6 | 1125 | 1215 |
| 4 | 1.91 | 5100 | 5700 | 1.4 | 1.4 | 0.40 | 0.46 | 6.8 | 7.1 | 1290 | 1305 |

[1]WG is with grain and AG is across grain.

It will be seen that the addition of up to 2 weight per cent of green fibers to the thermoplastic precursor material incorporating the low-fired particulates is a relatively simple and highly successful procedure for substantially increasing the flexural strength and strain-to-failure without increasing the modulus of elasticity to levels which would detract from the significant gains in flexural strength.

What is claimed is:

1. In a method of preparing graphite comprising the steps of forming a mixture of a particulate filler of a size less than 100 mesh and being a thermoplastic material coked at a temperature in the range of 400° to 1000°C. and a thermoplastic carbonizable organic binder in a concentration in the range of about 18 to 25 weight per cent of the mixture, simultaneously pressing and carbonizing the mixture at a temperature in the range of 1000°C. and of a particle size less than 100 mesh, a thermoplastic binder in a size range of less than 70 mesh and in a concentration of about 18 to 25 weight per cent of the mixture, and green organic carbonizable fibers in a maximum concentration of not more than 2 weight per cent of the particulate filler.

6. The improved composition of claim 5, wherein the particulate filler and the binder are selected from the group consisting of isotruxene, acenaphthylene, cinnamylideneindene, and coal or petroleum pitch.

7. The improved composition of claim 6, wherein the fibers are selected from the group consisting of rayon, phenolics, and polyacrylonitriles, and wherein the fibers have a length-to-diameter ratio in the range of 100:1 to 1000:1.

* * * * *